United States Patent [19]
Broad

[11] 3,841,568
[45] Oct. 15, 1974

[54] STREAMLINED FLOW IN FLUIDS

[75] Inventor: Bernard Henry Broad, Cornwall, England

[73] Assignee: English Clays Lovering Pochin & Company Limited, St. Austell, Cornwell, England

[22] Filed: Feb. 7, 1973

[21] Appl. No.: 330,399

[30] Foreign Application Priority Data
Feb. 7, 1972  Great Britain ...................... 5659/72

[52] U.S. Cl. ................................. 239/590, 138/44
[51] Int. Cl. ............................................ B05b 1/02
[58] Field of Search ........................ 239/590–590.5, 239/265.11, 265.13, 265.19, 265.25, 440, 441, 552, 553, 553.5, 558, 562; 181/46, 56, 66, 33 HB, 67, 33 HC, 60; 138/37, 39, 44; 169/15

[56] References Cited
UNITED STATES PATENTS
2,075,316  3/1937  Tyden ................................. 181/46

FOREIGN PATENTS OR APPLICATIONS
504,897   4/1920   France ............................ 239/590.5
496,231  11/1938   Great Britain ................... 239/553.5
1,240,046  7/1960   France ............................... 239/552

Primary Examiner—Robert S. Ward, Jr.
Attorney, Agent, or Firm—Armstrong, Nikaido & Wegner

[57] ABSTRACT

A device for inducing streamlined flow in a fluid moving within a conduit is provided. The device comprises at least one rigid baffle element adapted to be interposed in the flow path of the fluid, the baffle element having a dimension extending in the general direction of the flow path and, in cross-section perpendicular to the general direction of the flow path, being substantially in the form of a circular or spiral curve. When viewed in axial planes from the central axis of the conduit, the baffle generally affords at least three flow paths separated from each other in a radial direction by the baffle.

17 Claims, 2 Drawing Figures

PATENTED OCT 15 1974 3,841,568

STREAMLINED FLOW IN FLUIDS

BACKGROUND OF THE INVENTION

This invention relates to streamlined flow in fluids and, more particularly but not exclusively, is concerned with devices for inducing streamlined flow in a liquid flowing under high pressure.

In a number of industries, for example the clay industry, it is desirable to obtain streamlined or laminar flow in a fluid, generally a liquid, at a high pressure. In the clay industry, high pressure water jets are employed to wash clay-containing minerals from the earth. The high pressure water issues from a monitor which is a specially-adapted form of high pressure water hose designed to deliver a jet of water at high velocity. In view of the high velocity water flow issuing from the nozzles of these monitors a conduit configuration immediately prior to the outlet nozzle of the monitor has been developed which largely overcomes the high reaction thrust generated in the conduit. Without the reduction of this high reaction thrust firm fixing of the monitor to the quarry floor would be required, thereby severely reducing the mobility of the monitor. However, the monitor conduit configuration — generally a complete loop or coil in the conduit — creates an undesirable turbulence in the water flow on the downstream side of the loop or coil, and consequently creates a turbulent flow of water issuing from the nozzle. Because of the high pressures involved, turbulence in the water within and issuing from a monitor is undesirable since, for a given pumping energy, water with turbulent flow leaves the monitor at a lower velocity than does water with streamlined flow. Turbulence in the water issuing from a monitor causes the jet of water to diverge resulting in significantly lower water pressure on impact of the water with a surface, e.g. a quarry face.

SUMMARY OF THE INVENTION

According to one aspect of the present invention there is provided a baffle, adapted to be interposed in a fluid flow path within a conduit, for inducing streamlined flow in the fluid, the baffle including at least one rigid element which, when the baffle is located in a conduit, extends generally parallel to the direction of the flow path and which in section perpendicular to the flow path is concavely curved relative to the central axis of the conduit, the baffle affording when viewed in axial planes from the central axis of the conduit at least three flow paths separated from each other in a radial direction by the baffle.

According to another aspect of the present invention, there is provided a device for inducing streamlined flow in a fluid moving within a conduit, which device comprises a plurality of rigid baffle elements adapted to be interposed in the flow path of the fluid, the baffle elements having a dimension extending in the general direction of the flow path and each, in cross-section perpendicular to the general direction of the flow path, being substantially in the form of a circular or spiral curve the centre or origin of the curve being coincident with the central axis of the device.

DESCRIPTION OF THE PREFERRED EMBODIMENTS

The devices of the invention will hereinafter be referred to as "scrolls."

In the preferred embodiments of the invention, the or each element of the scroll can be considered to be the generatrix of a straight line parallel to the axis of the conduit moving in a curved path around the axis. Thus while numerous arrangements of the elements of the scroll are possible, preferred embodiments of the scroll comprise two or more coaxial tubes of sheet material and of different diameters from each other, or comprise at least one element which, in cross-section, has the form of a spiral. Such a spirally-formed element preferably consists of at least one revolution. Configurations intermediate these two are possible, for example a scroll may have two co-axial tubes in the annulus between which there is located a spirally-formed element. In scrolls where there are two or more separate spiral elements, the chirality of the two or more spiral elements are preferably the same. The radial separation between different elements of a scroll, or between different parts of a single element of a scroll, is advantageously uniform across the scroll.

Other embodiments of scrolls include a plurality of elements which are located so as to form, in cross-section, circumferentially spaced arcs of a common circle. In one such embodiment, a plurality of elements are located so as to form, in cross-section, a series of circumferentially spaced arcs of concentric circles, the arcs of one circle being circumferentially offset relative to the arcs of an adjacent circle. In such a scroll, the spaces between adjacent arcs in any one circle are preferably respectively disposed radially inwardly or outwardly of arcs in an adjacent circle.

A scroll advantageously includes at each axial end thereof a cylindrical tube of relatively small diameter located about the central axis of the baffle. Such cylindrical tubes preferably constitute that part of the scroll which is closest to the central axis. The diameter of such cylindrical tubes is preferably at least ¾ inch; where the scroll is to be used in a conduit having an outside diameter of 6 inches or greater, the cylindrical tubes preferably have a diameter of at least 15/16 inch.

In a preferred embodiment of the invention, the scroll comprises a member which has a cross-section in the form of the locus of a point which moves in a path which is the resultant of a circular motion of constant angular velocity about a fixed point and a radial motion which (a) acts in a direction normal to the instantaneous direction of said circular motion towards said fixed point and (b) is constant in magnitude until the point arrives at a fixed distance from said fixed point whereupon the radial motion terminates.

A scroll preferably includes about its periphery a cylindrical tube within which is disposed, and to which are secured, the elements of the scroll. The diameter of the cylindrical tube will depend upon the size of the conduit into which the scroll is to be placed; it is important that the scroll fits tightly into and/or is secured against relative motion with respect to the conduit. In order that a scroll may readily be replaced it is preferred for the scroll to include a peripheral cylindrical tube within which is disposed, and to which is secured, the elements of the scroll, the outer diameter of the cylindrical tube being substantially the same as the inner diameter of the conduit in which the scroll is to be used. It is possible, however, to have a scroll rigidly secured within a conduit by, for example, fins extending from a cylindrical tube of lesser diameter than that of the conduit to the walls of the conduit.

The scrolls will generally be formed of a thin plate-like material made into the desired shape(s) so that in use a scroll presents a minimum area of edges to the flowing fluid. It is particularly important for the leading edges of the scroll, i.e., the edges at that axial end of the scroll on which the flowing fluid first impinges, to present as little resistance as possible to the fluid flow. This can be achieved by employing very thin materials or by having the material taper to a relatively sharp edge at the leading edges. The wall thickness of the material employed to fabricate at least the baffle elements of a scroll should be as small as possible, and preferably not more than 0.10 inch.

The means for locating the elements of a scroll with respect to each other can include one or more supports, for example plates, arms or fins which, for example, extend or lie along a radius of the scroll and to which the elements are secured. The plates, arms or fins should be of sufficient extent to ensure that the elements are adequately supported but should not be so large or numerous as to reduce significantly the streamlining effect of the scroll upon fluid passing therethrough.

The function of the baffle elements is to provide a series of surfaces over which the fluid can flow with little resistance, and which are located so that turbulence in the fluid is limited and streamlined flow is encouraged. If the fluid whose flow is to be streamlined is initially very turbulent, the radial spacing of the elements may advantageously be relatively large: thus a 6 inch diameter scroll may have elements in the form of two or three concentric, evenly spaced circles. Less turbulent fluids can be subjected to the action of scrolls in which the radial spacing of the elements is relatively small. A single scroll may consist of two or more portions along the axial length thereof within which the radial separation between the elements becomes gradually stepwise finer on moving from one portion to the next. Alternatively, two or more scrolls may be employed in series, preferably with a gap therebetween to prevent turbulence at the ends of the elements. A sharp trailing edge may be advantageous to prevent the creation of such turbulence.

The invention also provides a conduit, a highpressure hose, and a nozzle, for example in a monitor, for fluids which includes one or more scrolls. A monitor is provided in which one or more scrolls are located within the hose thereof close to the nozzle thereof. Hoses of the invention may be of use for delivering under pressure gases, liquids and suspensions (solid/liquid, solid/gas and liquid/gas). They may be of use in quarrying argillaceous minerals, in fire fighting systems and in installations where turbulence is undesirable e.g., in hydro-electric power stations.

High-pressure hoses of the invention advantageously include two scrolls or two "groups" of scrolls, a group consisting of two or more scrolls placed axially end to end. The arrangement of elements in each of the two scrolls (or in each scroll of a group) is not critical, though the downstream scroll of any arrangement is preferably the coarest of the scrolls in that arrangement (i.e., the radial separation of the elements of that scroll is greater than the radial spacing of the elements of the other scrolls). Thus it is possible to employ two scrolls, the first being a relatively coarse scroll having spirally-arranged elements and the second (spaced apart axially from the first) being a relatively fine scroll having spirally arranged elements; the first being a relatively coarse scroll having co-axially disposed tubular elements and the second being a relatively fine scroll having co-axially disposed tubular elements; the first being relatively coarse scroll having spirally arranged elements and the second being a relatively fine scroll having co-axially disposed tubular elements; or the first being a relatively coarse scroll having co-axially disposed tubular elements and the second being a relatively fine scroll having spirally arranged elements. Alternatively, either or both of the scrolls can have a combination of co-axially disposed tubular elements and spirally arranged elements. Other configurations for the elements in each scroll may also be employed. It is preferable for there to be an axial separation between each scroll or each group of scrolls because such a gap exerts a smoothing effect in preventing turbulence at the trailing edge of one scroll and at the leading edge of the next. Thus a high-pressure hose can include a coarse scroll containing an axially extending element in the form, in cross-section, of a relatively loosely wound spiral or in the form of relatively widely separated concentric circles and a fine scroll containing an axially extending element in the form, in cross-section, of a relatively tightly wound spiral or in the form of relatively closely spaced concentric circles. These two scrolls are positioned within the hose so that the moving fluid impinges on the coarse scroll before impinging upon the fine scroll. The upstream scroll, i.e., the coarse scroll, should be of a more robust construction than the downstream scroll, i.e., fine scroll, in order that it may withstand physical impact of any solid matter inadvertently present in the fluid. Other arrangements, e.g., two coarse scrolls and one fine scroll or a series of scrolls arranged in order of graduated fineness, may be employed in high pressure hoses of the invention.

When two or more scrolls are employed within a single high pressure hose (or in any conduit through which a fluid at high pressure is to be passed), it is preferable for the scrolls to be spaced apart, for example by a hollow cylindrical tube; the separation between the scrolls is preferably at least equal to one half of the diameter of the conduit.

For a better understanding of the invention, and to show how the same can be carried into effect, reference will now be made, by way of example, to the accompanying drawings, in which.

Figure 1:
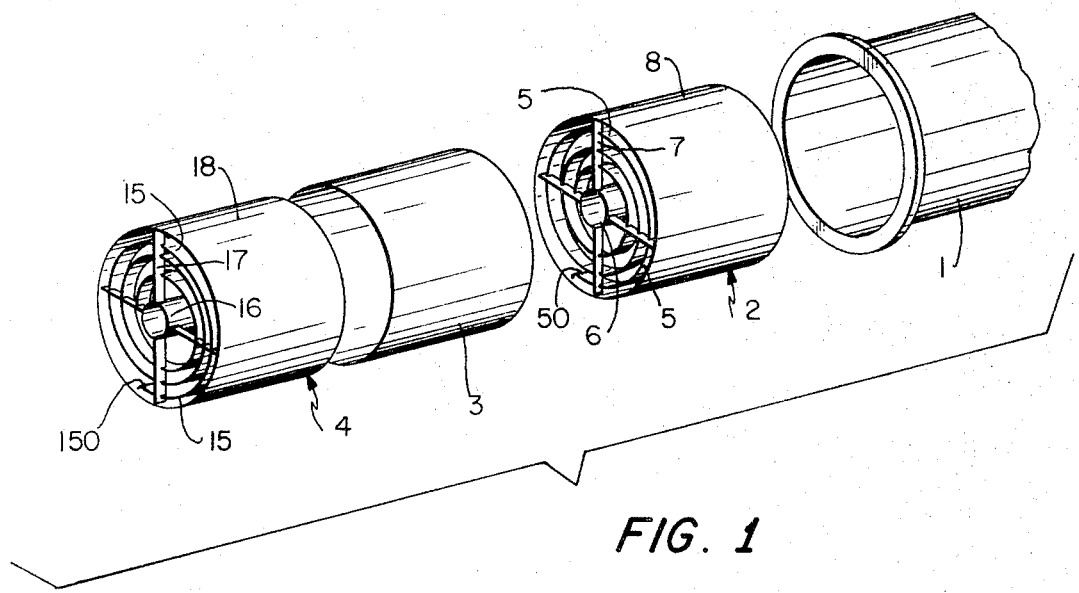
FIG. 1 is an exploded view of part of a monitor incorporating two scrolls.

Referring to the drawings, the monitor comprises a nozzle pipe 1 within which are successively located a coarse scroll 2, an intermediate spacer 3 and a fine scroll 4. The fine scroll 4 is adjacent to the nozzle of the monitor. Each of the scrolls includes a spiral element 5 or 15 which is attached at 50 or 150 to a peripheral cylindrical tube 8 or 18 of diameter 6 inches, and a number of radially extending fins 7 or 17 which are rigidly secured to their respective spiral elements 5 and 15 and to peripheral cylindrical tubes 8 and 18. The spiral element 5 or 15 terminates close to the central axis of the cylindrical tube 8 or 18 where it is secured to a part 6 or 16 which has a circular cross-section. The part 6 extends the full length of the coarse scroll 2, but the part 16 consists of two tubes of relatively short length located one at each axial end of the fine scroll 4. The spiral element 5 is formed of a non-corrodable material (e.g., a metal such as a stainless steel or a brass) of a thickness not less than 1/32 inch, and is wound into a spiral having approximately two and one-half tunrs. The spiral element 15 is constructed of a similar material to that of the spiral member 5 except that the material has a thickness not greater than 0.020 inch, and the spiral consists of at least three and one-half turns. The radial fins 7 or 17 which extend along diameters of the axial end faces of the scrolls, do not extend the full axial length of the scrolls 2 and 4, but are located only at the axial ends thereof. In both the coarse scroll 2 and the fine scroll 4, the radial fins 7 and 17 are of the same thickness as their respective spiral element 5 or 15. The intermediate spacer 3 consists of a hollow cylindrical tube which is of the same length as the two scrolls 2 and 4. The outside diameter of the part 6 and of each of the two tubes which form the part 16 is 15/16 inch.

Figure 2:
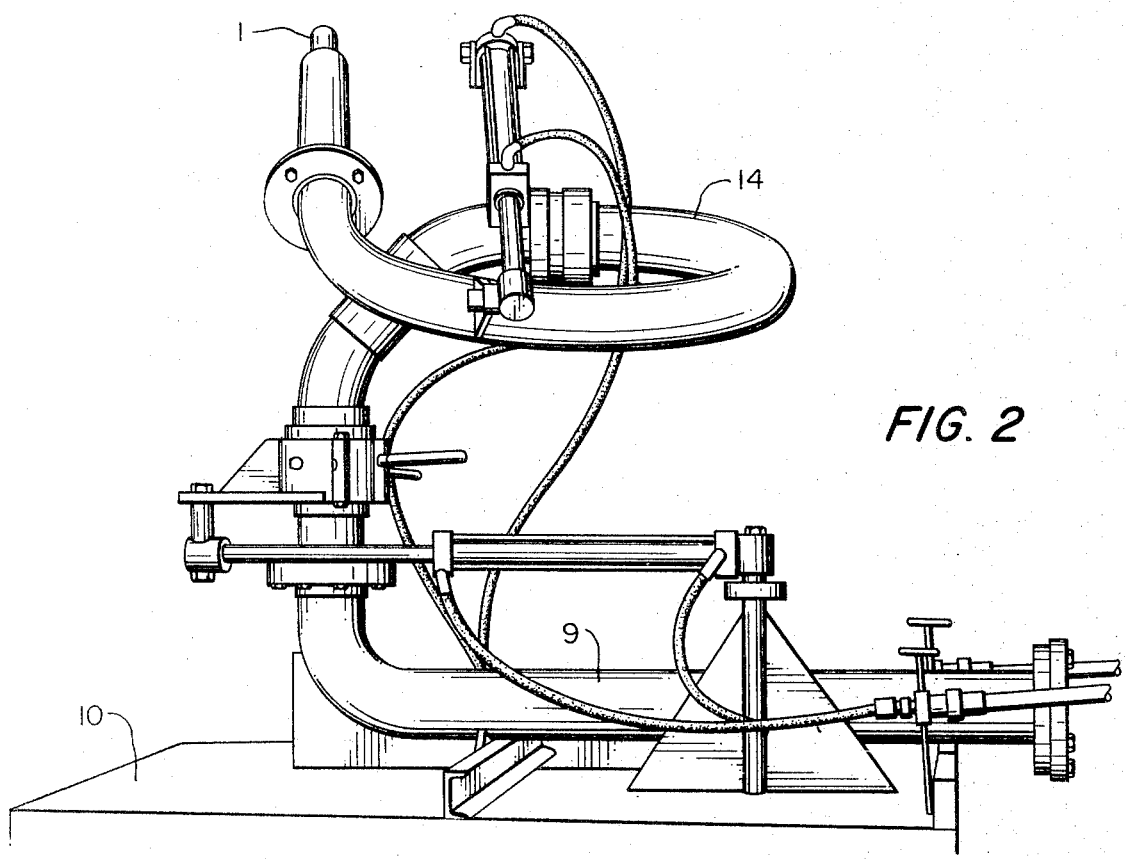
FIG. 2 is a perspective view of the monitor shown in FIG. 1.

The high-velocity waterjet monitor such as is used in the clay industry for washing clay from the earth is shown in perspective in FIG. 2. The nozzle 1, from which a high-velocity jet of water issues when the monitor is in use, the jet being directed at an area of earth where the clay is to be washed out, is supplied with water under high pressure through a supply pipe 9 which is secured to a base 10. The pipe 9 is arranged in the form of a loop or coil 14 for countering the reaction thrust of the jet, the supply pipe terminating at the nozzle 1.

In use, water flowing at a velocity of about 40 m.p.h. or above and at a pressure of approximately 400 p.s.i. impinges upon the coarse scroll 2. The spiral element 5 and the radial fins 7 of scroll 2 tend to establish streamlined flow within the conduit, so that the water leaving the coarse scroll 2 is less turbulent than that entering it. The zone contained within the intermediate spacer 3 is believed to act as a stabilizing zone in which any minor turbulence resulting from the egress of water from the trailing edges of the coarse scroll can become damped before the water impinges upon the fine scroll 4, where the more closely spaced spiral element 15 and the radial fins 17 reduce even further any turbulence remaining in the water. The gap between the two tubes of relatively short length which consitute the part 16 of the fine scroll 4 is believed to act in a similar manner. The part 6 is made to extend the full length of the coarse scroll 2 in order to give extra rigidity to the coarse scroll 2.

It has been found that, by employing one or more scrolls within the conduit of a monitor, the velocity and/or mass flow of water issuing from the nozzle of the monitor can be raised by up to a total of about 30% for a given pumping energy in comparison with that achieved without the use of such scrolls.

I claim:

1. A high-pressure hose comprising a nozzle and a conduit and wherein there is interposed in a fluid flow path within the conduit, for inducing streamlined flow in the fluid, a baffle including a peripheral cylindrical tube to which there is secured by at least one radial support at least one rigid element which extends generally parallel to the direction of the flow path and which in section perpendicular to the flow path is concavely curved relative to the central axis of the conduit, the baffle affording when viewed in axial planes from the central axis of the conduit at least three flow paths separated from each other in a radial direction by the baffle, and which further includes at each axial end thereof an individual cylindrical tube of relatively small diameter located about the central axis of the baffle, said individual cylindrical tubes being spaced apart from one another.

2. A high-pressure hose as claimed in claim 1, wherein the baffle comprises at least two co-axial tubes of sheet material and of different diameter from each other.

3. A high-pressure hose as claimed in claim 1, wherein said at least one rigid element, in cross-section, has the form of a spiral of at least one revolution.

4. A high-pressure hose comprising a nozzle, a conduit and for inducing streamlined flow in a fluid moving within the conduit, a device which comprises a peripheral cylindrical tube to which there is attached by at least one radial support at least one rigid baffle element adapted to be interposed in the flow path of the fluid, the baffle element having a dimension extending in the general direction of the flow path and, in cross-section perpendicular to the general direction of the flow path, being substantially curvilinear, the centre or origin of the curve being coincident with the central axis of the device, and which further includes at each axial end thereof an individual cylindrical tube of relatively small diameter located about the central axis of the device, said individual cylindrical tubes being spaced apart from one another.

5. A high-pressure hose as claimed in claim 4, wherein the device comprises at least two co-axial tubes of sheet material and of different diameter from each other.

6. A high-pressure hose as claimed in claim 4, wherein said at least one rigid baffle element, in cross-section, has the form of a spiral of at least one revolution.

7. A high-pressure hose as claimed in claim 4, wherein said device comprises a spirally-formed element which is attached to and located in the annulus formed between two co-axial tubes.

8. A high-pressure hose comprising a nozzle and a conduit defining a flow path communicating with the nozzle, wherein there are disposed within the conduit two baffles which are spaced apart in an axial direction, each of said baffles including at least one rigid element which extends generally parallel to the direction of the flow path and which in section perpendicular to the flow path is concavely curved relative to the central axis of the conduit, said baffles affording when viewed in axial planes from the central axis of the conduit at least three flow paths separated from each other in a radial direction by the baffle, the elements of the baffle which is more remote from the nozzle having a greater radial separation than the elements of the other baffle.

9. A high-pressure hose as claimed in claim 8, wherein the device comprises at least two co-axial tubes of sheet material and of different diameters from each other.

10. A high-pressure hose as claimed in claim 8, wherein said at least one baffle element, in cross-section, has the form of a spiral of at least one revolution.

11. A high-pressure hose as claimed in claim 8, wherein said device comprises a spirally-formed element which is attached to and located in the annulus formed between two co-axial tubes.

12. A high-pressure hose as claimed in claim 8, wherein there are a plurality of baffle elements located so as to form, in cross-section, circumferentially spaced arcs of a common circle.

13. A high-pressure hose as claimed in claim 12, wherein there are a plurality of baffle elements located so as to form, in cross-section, a series of circumferentially spaced arcs of concentric circles, the arcs of one circle being circumferentially offset relative to the arcs of an adjacent circle.

14. A high-pressure hose as claimed in claim 13, wherein the spaces between adjacent arcs in any one circle are respectively disposed radially inwardly or outwardly of arcs in an adjacent circle.

15. A high-pressure hose as claimed in claim 8, wherein the radial thickness of said at least one rigid element is not greater than 0.10 inch.

16. A high-pressure hose as claimed in claim 8, wherein the device includes at each axial end thereof a cylindrical tube of relatively small diameter located about the central axis of the device.

17. A high-pressure hose comprising a nozzle and a conduit defining a flow path communicating with the nozzle, wherein there are disposed within the conduit two devices for inducing streamlined flow in a fluid moving in said conduit towards said nozzle, one of said devices being disposed close to the nozzle but spaced apart from the other device in an axial direction by a distance which is at least equal to the diameter of the conduit; the elements of the device which is more remote from the nozzle having a greater radial separation than the elements of the other device; each of said devices further comprising a peripheral cylindrical tube to which there is attached by at least one radial support at least one rigid baffle element having a dimension extending in the general direction of the flow path and in cross-section perpendicular to the general direction of the flow path, being substantially curvilinear, the center or origin of the curve being coincident with the central axis of each device; said devices further including at each axial end thereof a cylindrical tube of relatively small diameter located about their respective central axis.

* * * * *